Patented May 9, 1933

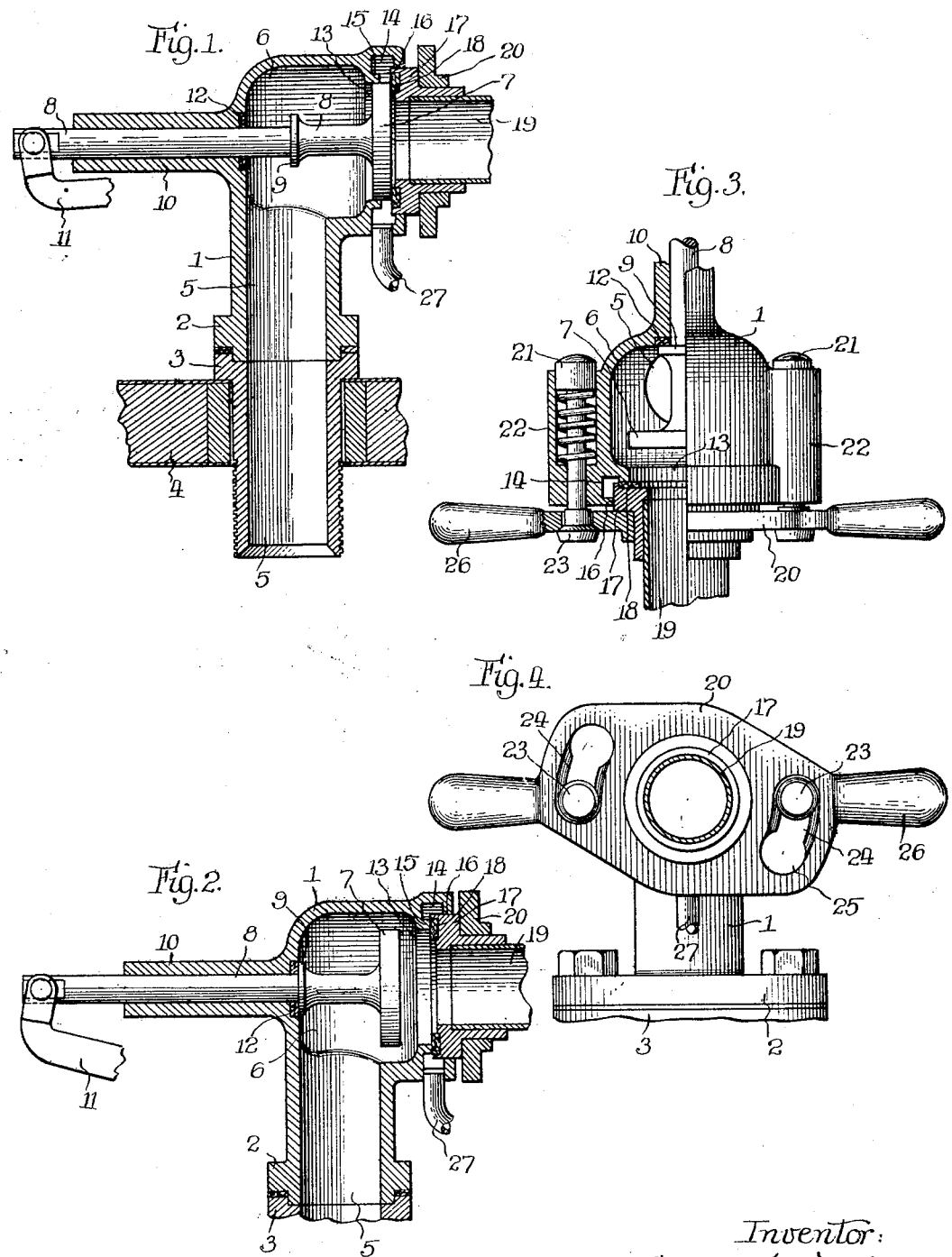

1,907,627

UNITED STATES PATENT OFFICE

GEORGE E. WALLIS, OF EVANSTON, ILLINOIS, ASSIGNOR TO THE CREAMERY PACKAGE MFG. COMPANY, OF CHICAGO, ILLINOIS, A CORPORATION OF ILLINOIS

VALVE

Application filed June 12, 1931. Serial No. 543,831.

The invention relates to valves for the control of edible fluids commonly known as sanitary valves, and more particularly to such valves as used in connection with the process of milk pasteurization wherein milk is held in suitable containers for a predetermined time at a predetermined temperature.

It is the principal object of the invention to provide an improved sanitary valve for controlling the filling and emptying of pasteurizing holders, which is constructed to intercept and direct outwardly from the main passages any leakage occurring in the valve when it is in closed position.

Another object is to provide a valve of simple construction which may be readily disassembled for cleaning, of compact dimensions, and economical in cost of manufacture.

Further objects and advantages will be apparent in the following detailed description of a preferred embodiment of the invention illustrated in the accompanying drawing, in which Fig. 1 is a sectional view in elevation showing the valve in closed position, Fig. 2 is a similar sectional view showing the valve in open position, Fig. 3 is a plan view partly in section, and Fig. 4 is an end view in elevation.

In the drawing, the numeral 1 indicates a body or casing having a coupling flange 2 for detachable mounting upon a flanged fixture 3 secured in a wall 4 of a container or otherwise adapted to support the valve body. As herein illustrated, a passage 5 extends through the body into a chamber 6 wherein is operatively positioned a reciprocatory valve plunger 7 supported by a stem 8 upon which is intermediately formed a shoulder or abutment 9. The stem 8 has operative bearing in an extension 10 of the body, the stem extending therethrough and being endwardly adapted for the attachment of operating mechanism of any desired form, as represented by the portion 11 of an actuating link pivoted to the stem. With the valve in open position, the shoulder 9 engages the resilient packing or seal ring 12 positioned in the wall of the casing at the inner end of the bearing for the stem.

A port 13 is provided in the wall of the casing about the chamber 6, the port being axially alined with the plunger 7 and its stem and of dimension to slidably receive the plunger 7. An annular channel 14 is provided in the wall of the casing outwardly of the port 13, the surrounding structure being formed to provide a ring seat 15 about and concentric with the port 13, and also to provide an outer bearing port or opening 16, there being an annular aperture between the two latter opening into the channel 14.

Slidably supported within the opening 16 is a valve seat ring 17 preferably having a resilient contact ring 18 adapted for engagement with the seat 15 upon inward movement of the ring 17 and for engagement by the plunger 7 upon outward movement of the latter. Secured within the ring 17 is a conduit pipe 19 having communication with the chamber 6 through the ring 17 and port 13. Outwardly of the ring 17 in detachable abutment therewith is a clamping plate 20 which functions to hold the contact ring 18 carried by the valve seat ring 17 normally in sealed engagement with the seat 15 and in closure of the aperture to the channel 14.

The clamping plate 20 is supported for resilient retraction from its normal position by the outward movement of the ring 17 when engaged by the plunger 7 in its outward or port closing movement, thus opening the annular aperture to the channel 14. The resilient support of the clamping plate preferably is effected by a pair of spring actuated bolts 21 positioned in suitable sockets provided in lateral extensions 22 of the casing structure, the bolts extending through the plate 20 and having draw heads 23 bearing outwardly upon the plate. To facilitate removal of the plate 20, for the disassembling of the valve structure in cleaning, slots 24 are provided for the supporting bolts, the slots having enlarged end openings 25 to permit passage of the draw heads 23. Handles 26 are formed on the plate 20 to assist its manual turning in removing and replacing the plate.

In its operation in control of the flow of milk into and out of pasteurizing holding tanks, the valve in closed position effectively prevents any leakage from passing into the milk conduit beyond the valve. It will be seen (Figure 1) that any leakage occurring from milk in the pipe 19 between the plunger 7 and the ring 17 will flow directly into the channel 14, and from there be drained away through a waste pipe 27. Likewise, any leakage from the chamber 6 between the plunger 7 and the port opening 13 will pass out through the channel 14. The slight movement of the pipe 19, to which the valve seat ring 17 is attached, occurring in the operation of the valve, may be compensated for by the flexing of the supply pipe line from which the pipe 19 leads and which is of considerable length in the usual installation, or the pipe 19 may be constructed in telescopic sections.

I claim as my invention:

1. A device of the class described comprising a casing having a port, a seat formed outwardly about the periphery of said port, a conduit, a valve seat ring establishing communication between said conduit and said port, said valve seat ring normally having contact with said seat and being movable into spaced relation thereto, and a valve plunger operable to close said port and engage said valve seat ring effectively to close said conduit and move said valve seat ring away from said seat.

2. A device of the class described comprising a casing having a port, a seat formed outwardly about the margin of said port, a drain channel formed in said casing outwardly of said seat, a conduit, a valve seat ring establishing communication between said conduit and said port, said valve seat ring being resiliently maintained in contact with said seat, and a valve plunger operable to close said port and engage said valve seat ring effectively to close said conduit and move said valve seat ring away from said seat.

3. A device of the class described comprising a casing having a port, a seat formed about the outer margin of said port, said casing structure being extended outwardly of said port and having an opening outwardly of said seat, said casing structure forming a lateral channel between said seat and said opening, a valve seat ring having a passage and having operable bearing in said opening, means for normally maintaining said valve seat ring in contact with said valve seat, and a plunger operable through said port to close said port and engage said valve seat ring in closure of said passage and move said ring out of contact with said seat.

4. A device of the class described comprising a casing having a port, a seat positioned about the outer margin of said port, a valve seat ring having a passage and being normally maintained in contact with said seat but movable outwardly therefrom, and a valve plunger operable to engage said valve seat ring in closure of said passage and to move said ring out of contact with said seat.

5. A device of the class described comprising a casing having a port, a ring having a passage and being resiliently maintained in contact with the marginal portion of said casing about said port, said casing having a channel formed therein in the plane of contact between said casing and said ring, and a valve plunger operable to engage said ring in closure of said passage and to move said ring out of contact with said marginal portion of said casing.

6. A device of the class described, comprising a casing having a port, a seat positioned outwardly about the margin of said port, a ring having a passage and normally being maintained in contact with said seat, a conduit communicating with the passage in said ring, a plate in outer abutment with said ring, spring means tending to force said plate and said ring inwardly toward said seat, and a valve plunger operable through said port to engage said ring in closure of said passage and move said ring out of contact with said seat.

7. A device of the class described, comprising a casing having a port, a valve seat ring having a passage and normally being seated against said casing about the outer end of said port, said casing structure being extended outwardly about said ring to form a bearing support therefor and forming a channel about the portion of said ring in contact with said casing about the outer end of said port, a removable plate in outer abutment with said ring, spring means tending to move said plate inwardly upon said ring and to maintain said ring in seated relation to said casing, and a valve plunger operable to engage said ring in closure of said passage and to move said ring into spaced relation to said casing about the outer end of said port.

8. A device of the class described comprising a casing having a port, a seat formed outwardly about the periphery of said port, a conduit, a valve seat ring establishing communication between said conduit and said port, said casing and said ring being relatively movable to effect contact between said seat and said ring and to effect the separation thereof into spaced relation, and a valve plunger operable to engage said ring effectively to close said conduit.

In witness whereof I have hereunto attached my signature.

GEORGE E. WALLIS.